United States Patent [19]
Steffens, Jr.

[11] Patent Number: 5,411,288
[45] Date of Patent: May 2, 1995

[54] AIR BAG MODULE DOOR ASSEMBLY

[75] Inventor: Charles E. Steffens, Jr., Washington, Mich.

[73] Assignee: TRW Vehicle Safety Systems Inc., Lyndhurst, Ohio

[21] Appl. No.: 146,950

[22] Filed: Nov. 3, 1993

[51] Int. Cl.⁶ .............................................. B60R 21/16
[52] U.S. Cl. ..................... 280/728.3; 411/2; 411/900
[58] Field of Search ..................... 280/728 B, 731, 732, 280/728 R; 411/2–5, 351, 356, 513, 900, 908

[56] References Cited

U.S. PATENT DOCUMENTS

| | | | |
|---|---|---|---|
| 3,708,179 | 1/1973 | Hulten | 280/732 |
| 4,842,299 | 6/1989 | Okamura et al. | 280/732 |
| 4,893,833 | 1/1990 | DiSalvo et al. | 280/732 |
| 4,925,209 | 5/1990 | Sakurai | 280/732 |
| 5,061,137 | 10/1991 | Gourd | 411/908 |
| 5,062,663 | 11/1991 | Satoh | 280/732 |
| 5,199,739 | 4/1993 | Fujiwara et al. | 280/728 B |
| 5,215,330 | 6/1993 | Kurita | 280/728 B |

FOREIGN PATENT DOCUMENTS

| | | | |
|---|---|---|---|
| 0415362 | 3/1991 | European Pat. Off. | 280/728 B |
| 3279055 | 12/1991 | Japan | 280/728 B |
| 2077845 | 12/1981 | United Kingdom | 411/908 |

Primary Examiner—Margaret A. Focarino
Assistant Examiner—Paul N. Dickson
Attorney, Agent, or Firm—Tarolli, Sundheim & Covell

[57] ABSTRACT

A door assembly (10) for an inflatable vehicle occupant restraint module (14) includes two doors (80, 100) which are pivotally mounted for movement between a closed position and an open position. The doors (80, 100) cover an opening (28) through which an inflatable air bag (22) deploys. Each door (80, 100) has at least one finger portion (120, 140, 152, 154) which overlaps the other door when the doors are in the closed position. The overlapping finger portions (120, 140, 152, 154) prevent inward pivoting movement of the doors (80, 100). A retainer assembly (200) holds the doors (80, 100) in the closed position and releases the doors to pivot outward upon inflation of the air bag (22). The retainer assembly (200) includes a frangible member (224) which ruptures.

18 Claims, 3 Drawing Sheets

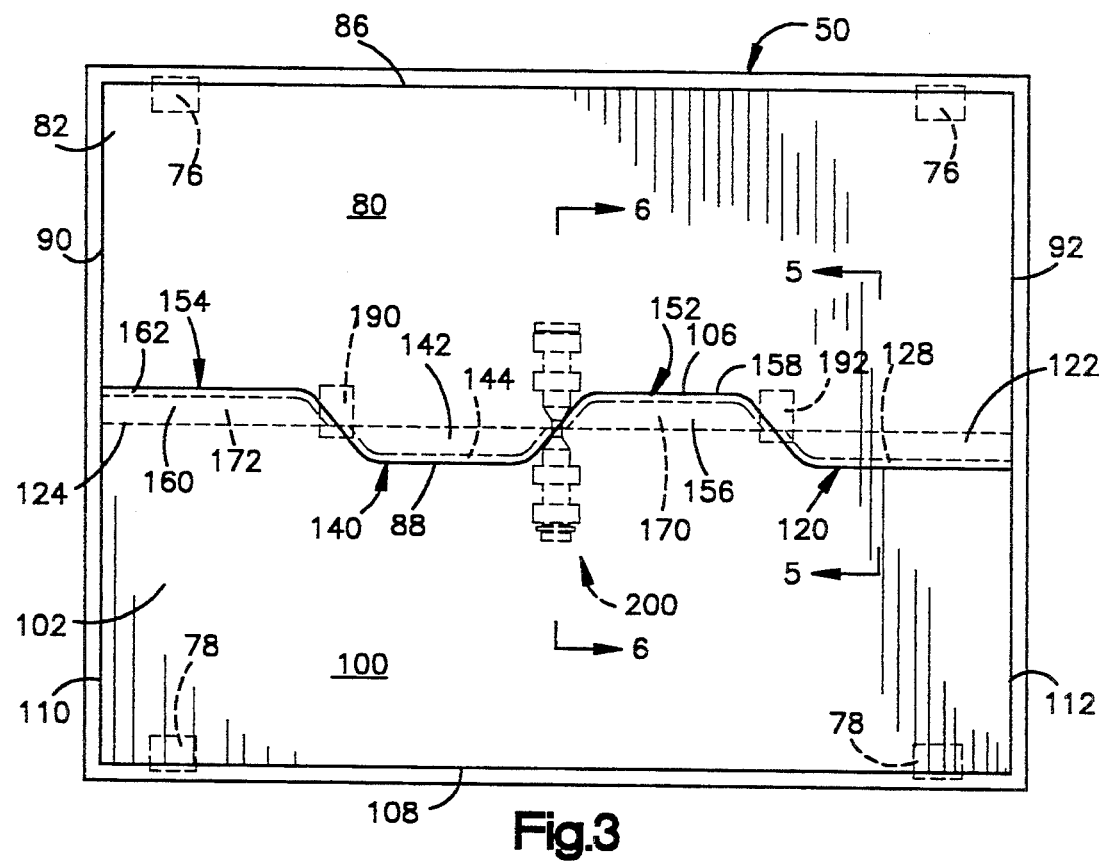

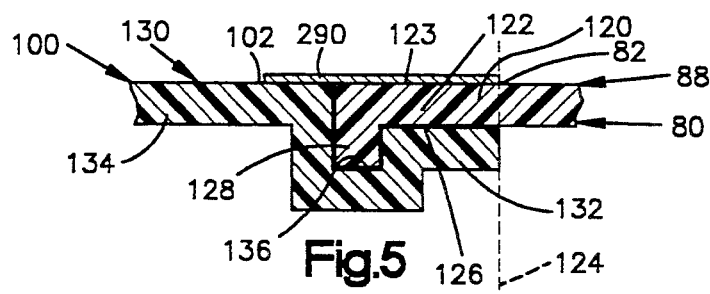
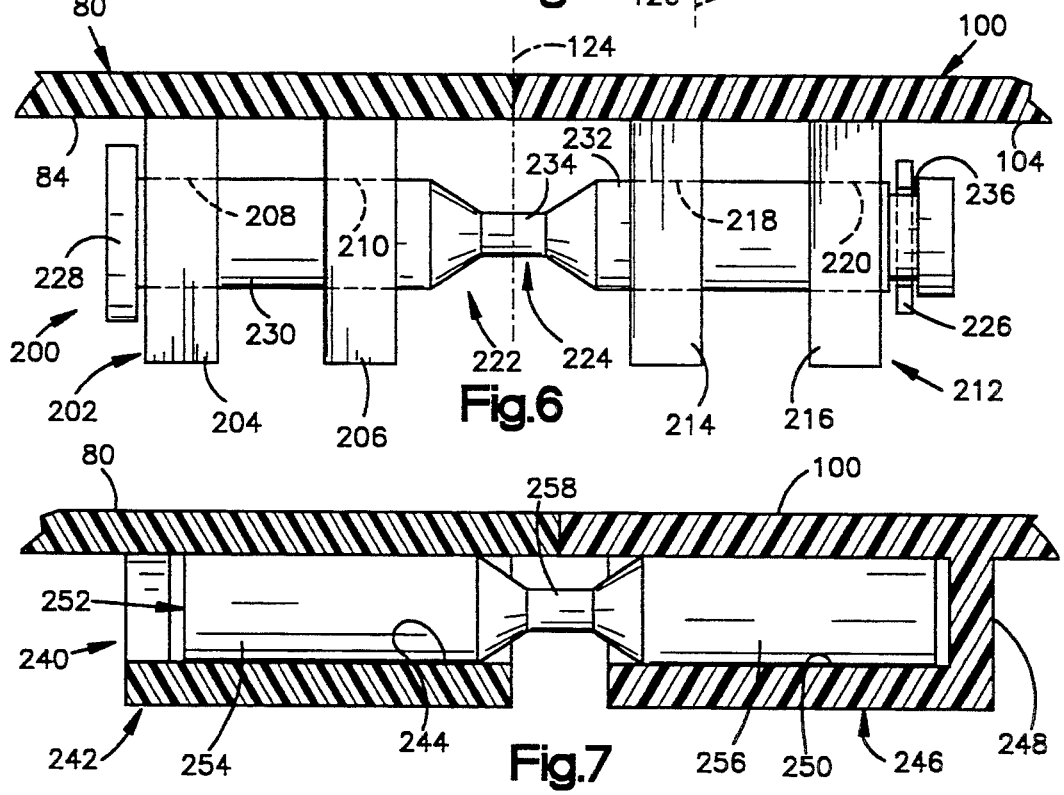
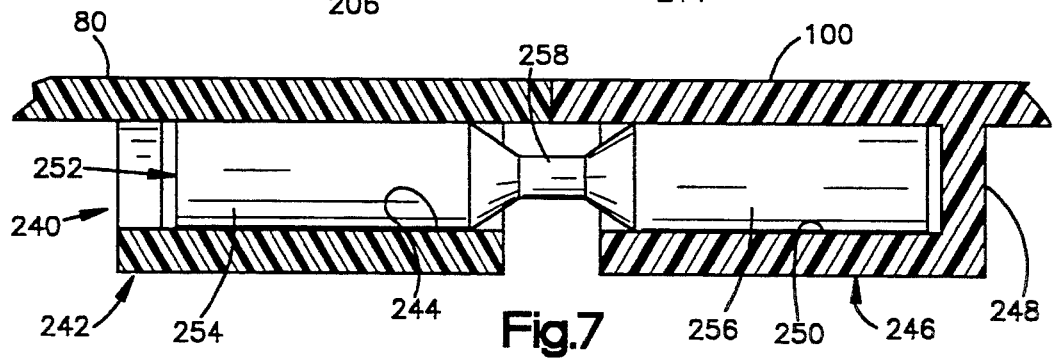
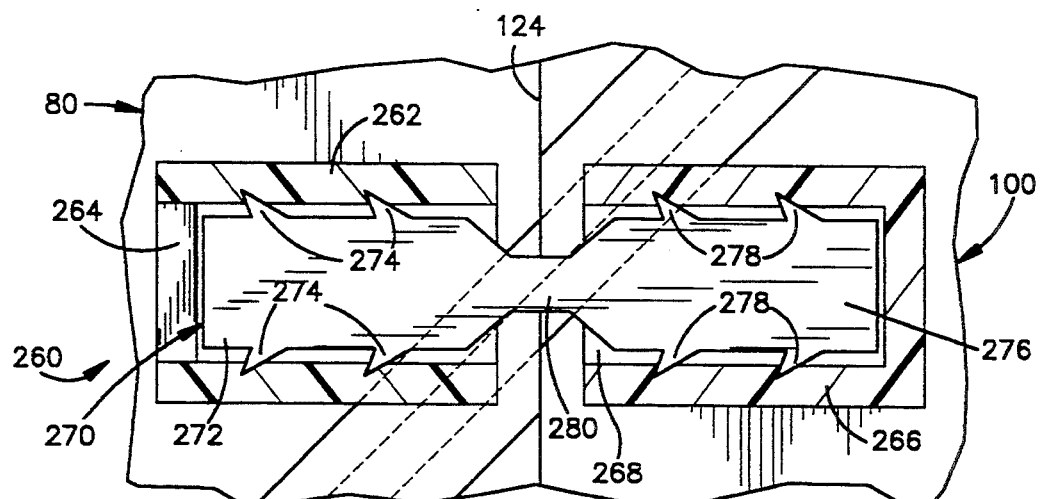

AIR BAG MODULE DOOR ASSEMBLY

BACKGROUND OF THE INVENTION

1. Technical Field

The present invention relates to a deployment door assembly for an inflatable vehicle occupant restraint module.

2. Description of the Prior Art

A known vehicle occupant restraint module includes an air bag and a gas source. The air bag is stored in a folded, deployment-ready position inside a housing. The gas source is also typically located in the housing. The housing has a deployment door which has a closed position protecting the air bag and gas source. The deployment door is moved to an open position when the air bag is inflated.

A known deployment door is a single hinged door which extends across an opening in the housing. The hinged door is held in place until the stored air bag begins to inflate. The inflating air bag forces the door to swing open as the air bag deploys through the opening.

Another known deployment door comprises two door flap portions joined by a tear seam. The tear seam retains the two flap portions together prior to deployment of the air bag. When the air bag begins to inflate, the air bag causes the tear seam to rupture and the two flap portions pivot outward to permit the air bag to deploy.

A door assembly for an air bag module may be exposed to a wide range of temperatures during the life of the vehicle in which the door assembly is mounted. The door assembly should desirably open under the application of the same amount of force from the deploying air bag, regardless of temperature. Door assemblies which use a door with a built-in tear seam are made of plastic materials with properties that tend to change with temperature. As the temperature varies, the amount of force required to open the tear seam may vary.

SUMMARY OF THE INVENTION

The present invention is a door assembly for an opening in a housing of a vehicle occupant restraint module. The vehicle occupant restraint module includes an inflatable vehicle occupant restraint, such as an air bag, for restraining movement of a vehicle occupant and a source of inflation fluid for inflating the air bag. Upon inflation, the air bag moves a portion of the door assembly to extend through the opening in the housing.

The door assembly includes a frame defining the opening and first and second doors pivotally connected with the frame for movement between a closed position and an open position. When in the closed position, the doors close the opening in the housing. To prevent inward pivoting of the doors when in the closed position, a first finger portion on the first door overlaps the second door and a second finger portion on the second door overlaps the first door.

The door assembly includes a retainer for retaining the first and second doors in the closed position. The retainer includes a frangible member having a first portion connected with the first door and a second portion connected with the second door. The frangible member is made of a material which ruptures upon application of a predetermined force over a range of temperatures. Upon application of the predetermined force to the first and second doors by the air bag upon deployment of the air bag, the retainer ruptures to permit the doors to pivot toward the open position.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an exterior view of the door assembly of FIG. 1;

FIG. 4 is an interior view of the door assembly of FIG. 1;

FIG. 5 is a sectional view taken along line 5—5 of FIG. 3;

FIG. 6 is a sectional view taken along line 6—6 of FIG. 3;

FIG. 7 illustrates a retainer assembly in accordance with a second embodiment of the invention; and FIG. 8 illustrates a retainer assembly in accordance with a third embodiment of the invention.

DESCRIPTION OF PREFERRED EMBODIMENT

Figure 1:
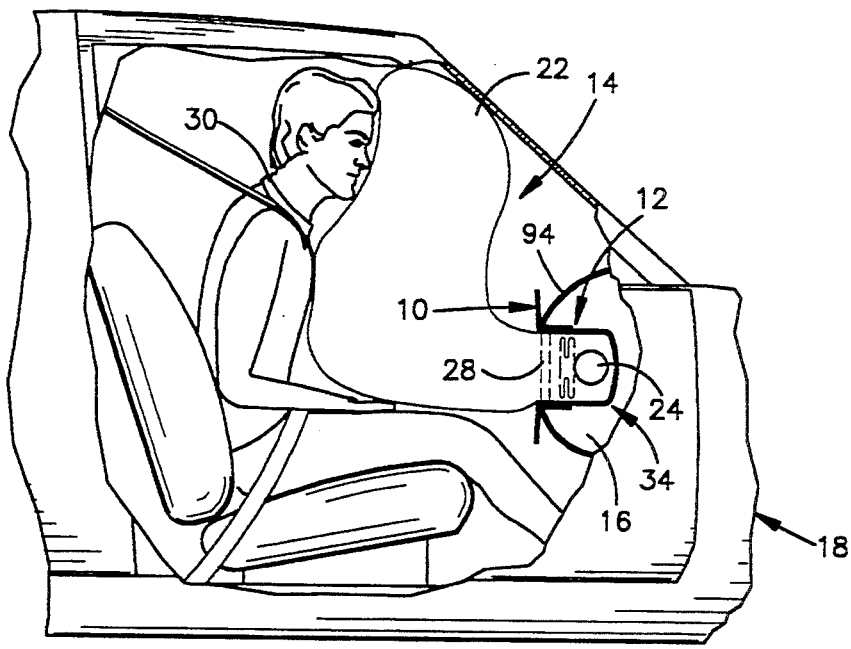
FIG. 1 is a partially broken away view of a vehicle which has a deployed inflatable occupant restraint system including a door assembly in accordance with the present invention.

The present invention relates to a door assembly for an inflatable vehicle occupant restraint module. The present invention is applicable to various module constructions. As representative of the present invention, FIG. 1 illustrates a door assembly 10.

The door assembly 10 is part of a housing 12 of a vehicle occupant restraint module 14. The vehicle occupant restraint module 14 is mounted in an instrument panel 16 of a vehicle 18, although the module could be mounted in other locations in the vehicle. The vehicle occupant restraint module 14 includes an inflatable air bag 22 folded and stored, along with an inflation fluid source 24, within the housing 12.

The door assembly 10 extends across an opening 28 in the housing 12 to conceal and protect the air bag 22. When the vehicle experiences deceleration indicative of a collision, a sensor (not shown) senses the deceleration and actuates the inflation fluid source 24 to direct inflation fluid into the air bag 22 to inflate the air bag. The inflating air bag 22 pushes open the door assembly 10 and extends rearwardly (relative to the vehicle 18) through the opening 28, to restrain movement of a vehicle occupant 30.

The housing 12 comprises a box-like container 34 (FIG. 2) which is secured to the vehicle 18 with appropriate fasteners (not shown). The container 34 includes a plurality of walls which either are formed as one piece with each other or are separate pieces fixed together. The walls include a top wall 36, a bottom wall 38, a left side wall 40, a right side wall 42 and an end wall 44. The walls define within the housing 12 a chamber 46. The inflation fluid source 24 and the air bag 22 (not shown in FIG. 2) are disposed in the chamber 46.

The door assembly 10 includes a frame 50. The frame 50, as illustrated, comprises rearward edge portions of the top, bottom, and side walls of the container 34. The frame 50 could also be a separate structure connected with the walls of the container 34. The frame 50 defines the opening 28. The frame 50 includes a top side 64, a bottom side 66, a left side 68 and a right side 70. The frame 50 includes a recessed left flange 72 which extends inwardly from the left frame side 68 into the opening 28. The frame 50 also includes a right flange 74 which extends inwardly from the right frame side 70 into the opening 28.

A pair of spaced apart upper hinge tabs 76 (FIG. 2) are attached to the frame top 64 by suitable fasteners (not shown). A pair of spaced apart lower hinge tabs 78 are attached to the frame bottom 66 by suitable fasteners (not shown). The hinge tabs 76 and 78 are each preferably made of one piece of bendable metal. The hinge tabs 76 and 78 could also be formed as portions of the container top and bottom walls 36 and 38, respectively.

The door assembly 10 includes an upper door 80. The upper door 80 has a rearward or outer surface 82 (FIG. 3) and a forward or inner surface 84 (FIG. 4). The upper door 80 (FIG. 3) has an upper edge portion 86, a lower edge portion 88 and two side portions 90 and 92.

Figure 2:
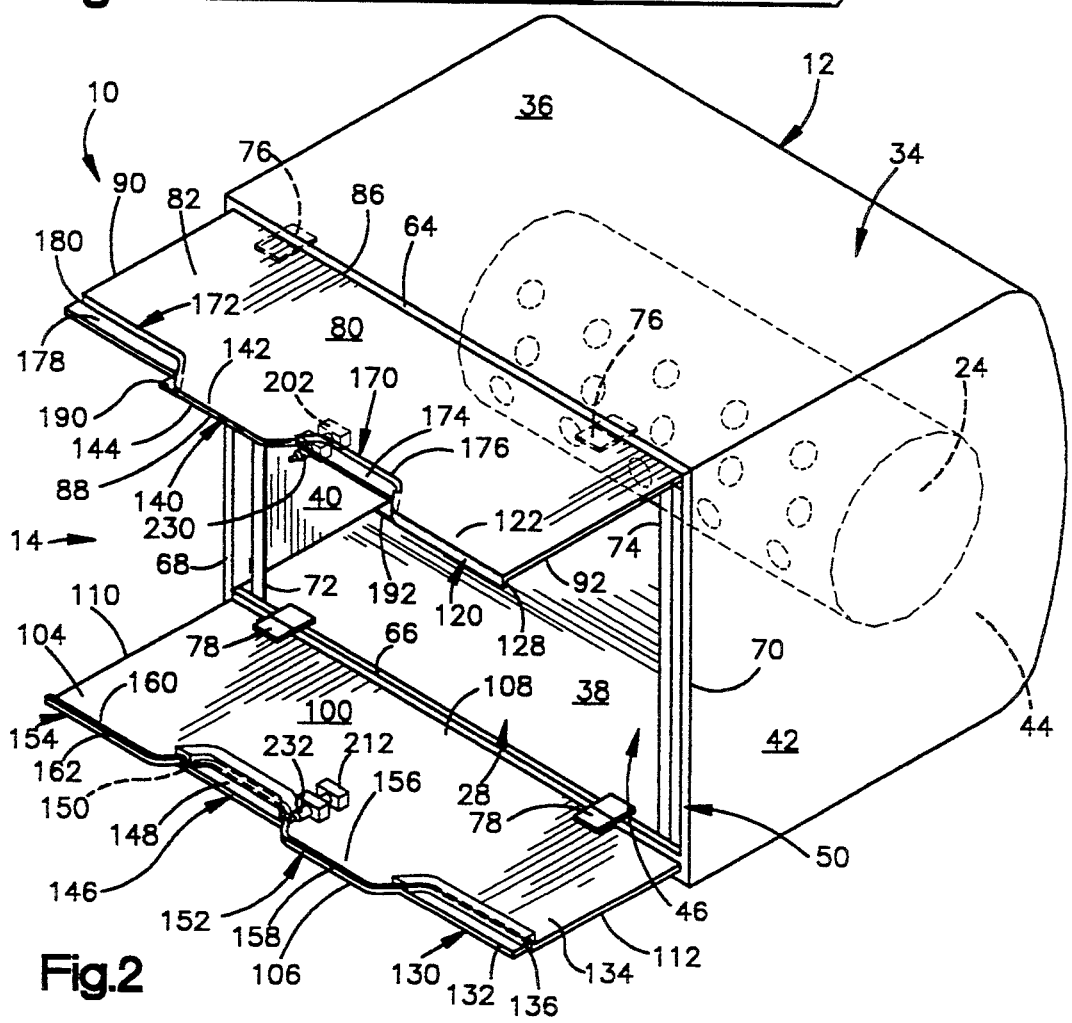
FIG. 2 is a schematic view of the restraint system of FIG. 1.

The upper edge portion 86 of the upper door 80 is connected to the upper hinge tabs 76 with suitable fasteners (not shown). The hinge tabs 76 are bendable to allow pivotal movement of the upper door 80 relative to the frame 50 between a closed position as shown in FIGS. 3 and 4 and an open position as shown in FIG. 2. The upper door 80, when in the closed position, extends over and closes an upper portion of the opening 28. In the closed position, the upper door side portions 90 and 92 overlie the recessed flanges 72 and 74, respectively, of the frame 50. The upper door outer surface 82 is flush with an exterior surface 94 (FIG. 1) of the instrument panel 16.

The door assembly 10 also includes a lower door 100 which is generally similar to the upper door 80. The lower door 100 has a rearward or outer surface 102 (FIG. 3) and a forward or inner surface 104 (FIG. 4). The lower door 100 has an upper edge portion 106, a lower edge portion 108 and two side portions 110 and 112.

The lower door lower edge portion 108 is connected to the second hinge tabs 78 with suitable fasteners (not shown). The hinge tabs 78 are bendable to allow pivotal movement of the lower door 100 between a closed position and an open position relative to the frame 50 via bending of the second hinge tabs 78. The lower door 100, when in the closed position, extends over a lower portion of the opening 28. In the closed position, the lower door side portions 110 and 112 overlie the recessed flanges 72 and 74, respectively, of the frame 50. The outer surface 102 is flush with the exterior surface 94 of the instrument panel 16.

The lower edge portion 88 (FIGS. 1 and 5) of the upper door 80 includes a first finger segment 120, which is disposed adjacent the side edge portion 92 of the upper door. The first finger segment 120 includes a planar portion 122 which extends (when the door assembly 10 is in the closed position) past an imaginary center line 124 of the door assembly 10, in a direction away from the hinge tabs 76. The planar portion 122 has an outer surface 123 which is a continuation of and includes a portion of the upper door outer surface 82. The planar portion 122 has an inner surface 126 which is a continuation of and includes a portion of the upper door inner surface 84. The first finger segment 120 also includes a peripheral bead 128 projecting inwardly from the inner surface 126 of the planar portion 122 in a direction into the chamber 46 in the housing 16. The bead 128 extends along the length of the first finger segment 120.

The first finger segment 120 is engageable with a first recess segment 130 on the lower door 100, which is disposed adjacent the side edge portion 112 of the door. The first recess segment 130 includes a planar portion 132 disposed parallel to and recessed inwardly from a main body portion 134 of the lower door 100. A groove 136 formed in the recessed portion 132 separates the recessed portion from the main body portion 134. The groove 136 extends along the length of the first recess segment 130.

When the door assembly 10 is in its closed condition, the bead 128 of the first finger segment 120 on the upper door 80 is received in the groove 136 of the first recess segment 130 on the lower door 100. The finger segment planar portion 122 overlies the recess segment recessed portion 132 and is disposed in the same plane as the lower door main body portion 134. Thus, the outer surfaces 82 and 102 of the doors 80 and 100, respectively, are flush with each other.

The upper door 80 has a second finger segment 140 which is similar in configuration to the first finger segment 120. The second finger segment 140 has a planar portion 142 and an inwardly projecting bead 144 which extends along the length of the second finger segment.

The lower door 100 has a second recess segment 146 which is similar in configuration to the lower door first recess segment 130. The lower door second recess segment 146 has a recessed flat portion 148 and a groove 150 separating the recessed flat portion 148 from the lower door main body portion 134.

The lower door also has two finger segments 152 and 154 which are similar in configuration to the upper door finger segments 120 and 140. The lower door first finger segment 152 has a planar portion 156 and a projecting bead 158 and is disposed intermediate the lower door first and second recess segments 130 and 146. The lower door second finger segment 154 has a planar portion 160 and a projecting bead 162 and is disposed adjacent the lower door second recess segment 146 and the side edge portion 110 of the lower door 100.

The upper door 80 also has two recess segments 170 and 172. The upper door recess segments 170 and 172 are similar in configuration to the lower door recess segments 130 and 146. The upper door first recess segment 170 has a recessed planar portion 174 and a groove 176. The upper door first recess segment 170 is disposed intermediate the upper door first and second finger segments 120 and 140. The upper door second recess segment 170 has a planar recessed portion 178 and a groove 180. The segment 172 is disposed adjacent the upper door second finger segment 140 and the side edge portion 90 of the upper door 80.

When the doors 80 and 100 are in the closed position, the finger segments on each door, which project past the centerline 124 of the door assembly 10, overlap the recess segments of the other door to prevent inward pivoting of the doors. The elongate beads of the respective finger segments are received in the elongate grooves of the respective recess segments, as illustrated in an exemplary manner in FIG. 5.

Thus, the first finger segment 120 on the upper door 80 overlaps the first recess segment 130 on the lower door 100. The bead 128 on the finger segment 120 is received in the groove 136 of the recess segment 130. The planar portion 122 of the finger segment 120 overlies the recessed planar portion 132 of the recess segment 130.

Similarly, the second finger segment 140 on the upper door 80 overlaps the second recess segment 146 on the lower door 100. The bead 144 on the finger segment 140 is received in the groove 150 of the recess segment 146. The planar portion 142 of the finger segment 140 overlies the recessed planar portion 148 of the recess segment 146.

Also, the first finger segment 152 on the lower door 100 overlaps the first recess segment 170 on the upper door 80. The bead 158 on the finger segment 152 is received in the groove 176 of the recess segment 170. The planar portion 156 of the finger segment 152 overlies the recessed planar portion 174 of the recess segment 170.

The second finger segment 154 on the lower door 100 overlaps the second recess segment 172 on the upper door 80. The bead 162 on the finger segment 154 is received in the groove 180 of the recess segment 172. The planar portion 160 of the finger segment 154 overlies the recessed planar portion 180 of the recess segment 172.

The outer surface 82 of the upper door 80 is therefore flush with the outer surface 102 of the lower door 100 when the doors 80 and 100 are in the closed position. The finger segments 120 and 140 of the upper door 80 alternate and intermesh with the finger segments 152 and 154 of the lower door 100. The opening 28 is covered and the folded air bag 22 is concealed. The engagement of the elongate beads on the various finger segments of the doors 80 and 100, in the elongate grooves of the various recess segments of the doors, prevents objects from entering into the housing 12 and engaging the folded air bag 22.

It should be noted that the flanges 72 and 74 of the frame 50 are optional and not necessary. The overlapping engagement of the doors 80 and 100 prevents the doors from moving into the housing 12. It should further be noted that any appropriate number of finger segments may be used, rather than the four finger segments shown in the illustrated embodiment.

A pair of gap hider tabs 190 and 192 are attached to the inner surface 84 (FIG. 4) of the upper door 80. One gap hider tab 192 is disposed at the junction of the upper door first recess segment 170 and the upper door first finger segment 120. The other gap hider tab 190 is disposed at the Junction of the upper door second recess segment 172 and the upper door second finger segment 140.

The gap hider tabs 190 and 192 extend past the centerline 124 of the door assembly 10 in a direction away from the upper door upper edge portion 86. The gap hider tabs 190 and 192 extend across the seam between the doors 80 and 100, on the inside of the door assembly 10, and partially overlap the lower door. The gap hider tabs 190 and 192 conceal the folded air bag 22 through the seam between the doors 80 and 100.

The visible seam between the doors 80 and 100 is not a straight line. Thus, as illustrated in FIG. 5, a cosmetic strip 290 may optionally be added to cover the seam. The cosmetic strip 290 may be, for example, a piece of decorative tape fastened to one of the doors 80 and 100. If a piece of tape were attached to both of the doors 80 and 100, the adhesive structure of the tape would have to be overcome by the pressure of the air bag 22 opening the door assembly 10.

The door assembly 10 also includes a retainer assembly 200 for retaining the doors 80 and 100 in the closed position. The retainer assembly 200 includes a retainer holder 202 (FIG. 6) disposed on the inner surface 84 of the upper door 80. The retainer holder 202 includes two ring members 204 and 206 having vertically aligned openings 208 and 210, respectively. The ring members 204 and 206 may either be molded as one piece with the upper door 80 or connected to the door by suitable fasteners.

A similar retainer holder 212 (FIG. 6) is disposed on the inner surface 104 of the lower door 100. The retainer holder 212 includes two ring members 214 and 216 with vertically aligned openings 218 and 220, respectively. The ring members 214 and 216 may either be molded as one piece with the lower door 100 or connected to the door by suitable fasteners.

A retainer 222 (FIG. 6) is received in the retainer holders 202 and 212 of the doors 80 and 100 and holds the doors in the closed position prior to deployment of the air bag 22. (For clarity, FIG. 6 does not illustrate the overlap of the doors 80 and 100.) The retainer 222 includes a shearable retainer pin 224 and a clip 226. The retainer pin 224 has a head portion 228 adjacent an upper cylinder portion 230. A lower cylinder portion 232 is separated from the upper cylinder portion 230 by a small diameter waist portion 234. The lower cylinder portion 232 has an annular recess 236 adjacent its lower end.

The retainer pin upper cylinder portion 230 fits snugly in the openings 208 and 210 of the retainer holder 202 on the upper door 80. The retainer pin lower cylinder portion 232 fits snugly in the openings 218 and 220 of the retainer holder 212 on the lower door 100. The retainer pin waist portion 234 is disposed adjacent to the center line 124 between the upper door 80 and the lower door 100. The clip 226 is disposed in the recess 236 of the lower cylinder portion 232.

The retainer pin head portion 228 has a diameter greater than the diameter of the opening 208 in the upper door retainer holder 202. The retainer pin head portion 228 thus blocks movement of the retainer pin 224 out of the retainer holders 202 and 212 in a direction to the right as viewed in FIG. 6. The clip 226 has a diameter greater than the diameter of the opening 220 in the lower door retainer holder 212. The clip 226 thus blocks movement of the retainer pin 224 out of the retainer holders 202 and 212 in a direction to the left as viewed in FIG. 6. The retainer pin 224 is thus blocked from removal from the door assembly 10.

Upon actuation of the vehicle occupant restraint apparatus 14 (FIG. 1), the inflation fluid source 24 directs inflation fluid into the folded air bag 22. As the air bag 22 fills with inflation fluid, it unfolds and pushes outwardly against the doors 80 and 100. The outward directed force on the doors 80 and 100 stresses the retainer pin 224. When the force on the doors 80 and 100 reaches a predetermined level, the retainer pin 224 fractures or shears at the waist portion 234, releasing the upper and lower doors.

The inflating air bag 22 forces the upper door 80 and the lower door 100 to move outward from the closed position to the open position shown in FIGS. 1 and 2. The upper hinge tabs 76 bend to allow upward pivoting of the upper door 80. The lower hinge tabs 78 bend to allow downward pivoting of the lower door 100. As the doors 80 and 100 pivot outward, the inflating air bag 22 extends outward through the opening 28. The air bag 22 thus inflates to restraint movement of the vehicle occupant 30.

The overlapping engagement of the upper door 80 and the lower door 100 blocks inward pivotal movement of the doors. The door assembly 10 thus resists inwardly directed force from the outside of the module 12 such as may occur from a vehicle occupant pressing on the instrument panel 16. At the same time, because the doors 80 and 100 move away from each other as they pivot outward, the door assembly 10 opens without significant resistance. Thus, the doors 80 and 100 do not resist opening from pressure within as from the deploying air bag 22. And in assembly of the module 12, the opening process is simply reversed as the doors are pivoted from the open position to the closed position.

The material of which the retainer pin 224 is made, and the diameter of its waist portion 234, are selected so that the retainer pin shears upon application of a predetermined outward directed force to the upper and lower doors 80 and 100. The amount of force required to shear the pin 224 at the waist portion 234 does not vary over a range of temperature from about −40° F. to about +185° F. This is the temperature range which the vehicle occupant restraint apparatus 14 may encounter while it is in the vehicle 18.

In a preferred embodiment, the retainer pin 224 is made from aluminum and the diameter of the retainer pin waist portion 234 is 0.08 inches. Desirable materials for the retainer pin 224 have a brittle failure breakage instead of an extruded break. Glass filled polymers may be suitable for the material of the retainer pin since they have stable physical characteristics in the applicable temperature range and have a brittle fracture mode.

FIG. 7 illustrates a retainer assembly 240 in accordance with a second embodiment of the invention. The retainer assembly 240 includes an open-ended tube 242 disposed on the upper door 80. The tube 242 has a cylindrical central opening 244. The retainer assembly 240 includes on the lower door 100 a tube 246 closed at one end 248 and having a cylindrical central opening 250. (FIG. 7, for clarity, does not illustrate the overlap of the doors 80 and 100.)

The retainer assembly 240 also includes an aluminum retainer pin 252. The retainer pin 252 has a first end portion 254 received in frictional, press-fit, engagement in the opening 244 of the tube 242. A second end portion 256 of the retainer pin 252 is received in frictional, press-fit, engagement in the opening 250 of the tube 246. The press-fit engagement of the retainer pin 252 in the tubes 242 and 246 prevents removal of the pin by vibration.

The retainer pin has a narrow waist portion 258 located adjacent to the Junction between the doors 80 and 100. The material and diameter of the waist portion 258, like those of the waist portion 234 of the retainer pin 224 (FIG. 6), are selected so that the retainer pin 252 shears upon the application of a predetermined outwardly directed force to the upper and lower doors 80 and 100. This force does not vary over the above-mentioned range of temperatures to which the retainer pin 252 may be subjected.

FIG. 8 illustrates a retainer assembly 260 in accordance with a third embodiment of the invention. The retainer assembly 260 includes a sleeve 262 on the upper door 80 having a cavity 264 with a rectangular cross-sectional configuration. A closed end sleeve 266 on the lower door 100 defines a cavity 268 with a similar rectangular cross-sectional configuration.

The retainer assembly 260 includes a flat aluminum retainer plate 270. The retainer plate 270 has a first end portion 272 with a plurality of barbs 274 and a second end portion 276 with a plurality of barbs 278. The first end portion 272 is located in the cavity 264 and the second end portion 276 is located in the cavity 268. A narrow waist portion 280 is disposed between the end portions 272 and 276, adjacent to the junction 124 between the upper and lower doors 80 and 100.

The barbs 274 penetrate the material of the sleeve 262, and the barbs 278 penetrate the material of the sleeve 266, to prevent removal of the retainer plate 270 as a result of vibration or other forces. The waist portion 280 is sized to shear upon deployment of the air bag 22, to permit the upper and lower doors 80 and 100 to pivot outwardly. The material and dimensions of the retainer plate waist portion 280 are selected so that the retainer plate 270 shears upon the application of a predetermined outwardly directed force to the doors 80 and 100. The amount of force required to shear the retainer plate 270 at the waist portion 280 does not vary over the range of temperatures of about '40° F. to about +185° F.

From the above description of the invention, those skilled in the art will perceive improvements, changes and modifications in the invention. For example, in the illustrated embodiment of the invention, the housing 12 is illustrated as comprising a container 34 that is formed separately from other portions of the vehicle 18 and then attached to the vehicle. The container 34, including the frame 50, could be defined, however, by surfaces of other components of the vehicle 18, such as the instrument panel 16, to avoid having to construct a separate container 34. Such improvements, changes and modifications within the skill of the art are intended to be covered by the appended claims.

I claim:

1. A door assembly for an opening of a housing for an inflatable vehicle occupant restraint module, which housing has a frame defining the opening attached thereto, said door assembly comprising:

a first door for covering a first portion of the opening;

first pivot means for connecting said first door with said frame for outward pivotal movement relative to said frame between a closed position and an open position;

a second door for covering a second portion of the opening;

second pivot means for connecting said second door with said frame for outward pivotal movement relative to said frame between a closed position and an open position; and means for blocking inward pivotal movement of said first and second doors from the closed position comprising a first finger portion on said first door and a second finger portion on said second door, said first finger portion on said first door overlapping said second door and said second finger portion on said second door overlapping said first door when said first and second doors are in the closed position;

said first door having a third finger portion overlapping said second door, said first and third finger portions on said first door being spaced apart from each other;

said second door having a fourth finger portion overlapping said first door, said second and fourth finger portions on said second door being spaced apart from each other;

said third finger portion on said first door being disposed intermediate said second and fourth finger portions on said second door when said doors are in the closed position, and said second finger portion on said second door being disposed intermediate said first and third finger portions of said first door when said doors are in the closed position.

2. A door assembly for an opening of a housing for an inflatable vehicle occupant restraint module, which housing has a frame defining the opening attached thereto, said door assembly comprising:

a first door for covering a first portion of the opening;

first pivot means for connecting said first door with said frame for outward pivotal movement relative to said frame between a closed position and an open position;

a second door for covering a second portion of the opening;

second pivot means for connecting said second door with said frame for outward pivotal movement relative to said frame between a closed position and an open position;

means for blocking inward pivotal movement of said first and second doors from the closed position, comprising a first finger portion on said first door and a second finger portion on said second door, said first finger portion on said first door overlapping said second door and said second finger portion on said second door overlapping said first door when said first and second doors are in the closed position; and retainer means for releasably holding said first and second doors in their respective closed positions, said retainer means comprising a shear pin having a first end portion connected with said first door and a second end portion connected with said second door and a central portion interconnecting said first and second end portions, said shear pin being made of a material having a rupture strength which ruptures upon application of a predetermined force wherein the rupture strength which remains substantially constant over a range of temperatures of about −40° F. to about +185° F.

3. A door assembly for an opening of a housing for a vehicle occupant restraint module, said door assembly comprising:

first and second doors connected with said housing for pivotal movement between a closed position and an open position; and retainer means for retaining said doors in the closed position and for releasing said doors to permit pivotal movement of said doors to the open position upon application of a predetermined force to said doors;

said retainer means comprising a frangible member having a first end portion connected with said first door and a second end portion connected with said second door and a central portion intermediate said end portions;

said frangible member central portion being made of a material having a rupture strength which ruptures upon application of a predetermined force, said rupture strength being substantially unvarying over a predetermined range of temperatures encountered by said door assembly in the vehicle, said frangible member comprising a pin having a relatively narrow central portion interconnecting relatively wide first and second end portions.

4. A door assembly for an opening of a housing for a vehicle occupant restraint module, said door assembly comprising:

first and second doors connected with said housing for pivotal movement between a closed position and an open position; and retainer means for retaining said doors in the closed position and for releasing said doors to permit pivotal movement of said doors to the open position upon application of a predetermined force to said doors;

said retainer means comprising a frangible member having a first end portion connected with said first door and a second end portion connected with said second door and a central portion intermediate said end portions;

said frangible member central portion being made of a material having a rupture strength which ruptures upon application of a predetermined force, said rupture strength being substantially unvarying over a predetermined range of temperatures encountered by said door assembly in the vehicle;

said first door including a first retainer holder for holding said first end portion of said frangible member, said second door including a second retainer holder for holding said second end portion of said frangible member, said first and second retainer holders blocking removal of said frangible member from said first and second doors.

5. A door assembly as set forth in claim 4 wherein said first end portion of said frangible member is press fit in said first retainer holder and said second end portion of said frangible member is press fit in said second retainer holder to block relative movement between said frangible member and said first and second doors.

6. A door assembly as set forth in claim 4 wherein said frangible member comprises barb means for penetrating the material of said first and second retainer holders to block removal of said frangible member from said doors.

7. A door assembly as set forth in claim 4 wherein said first end portion of said frangible member has an enlarged head portion engageable with said first retainer holder for blocking movement of said frangible member in a first direction, said second end portion of said frangible member having an annular recess, a clip in said recess and engageable with said second retainer holder for blocking movement of said frangible member in a second direction.

8. A door assembly for an opening of a housing for an inflatable vehicle occupant restraint module, which housing has a frame defining the opening attached thereto, said door assembly comprising:

a first door for covering a first portion of the opening;

first pivot means for connecting said first door with said frame for outward pivotal movement relative to said frame between a closed position and an open position;

a second door for covering a second portion of the opening;

second pivot means for connecting said second door with said frame for outward pivotal movement relative to said frame between a closed position and an open position;

said first and second doors when in the closed position having a junction and a center line extends adjacent the junction across said first and second doors; and means for blocking inward pivotal movement of said first and second doors from the closed position, comprising a first finger portion on said first door and a second finger portion on said second door, said first finger portion on said first door overlapping said second door and said second finger portion on said second door overlapping said first door when said first and second doors are in the closed position, said first and second finger portions having locations, respectively, which are spaced apart along the center line when said first and second doors are in the closed position.

9. A door assembly as set forth in claim 8 wherein each of said first and second doors has a respective main body portion with a respective outer surface, said means for blocking further comprising door portions recessed inwardly from said main body portions of said first and second doors, said first finger portion on said first door overlapping said recessed portion of said second door and said second finger portion on said second door overlapping said recessed portion of said first door when said first and second doors are in the closed position, said outer surface of said first door being in generally the same plane as said outer surface of said second door when said doors are in the closed position.

10. A door assembly as set forth in claim 9 wherein each one of said finger portions includes a respective inwardly extending bead portion, each one of said recessed portions including surfaces defining a respective groove, said bead portions being received in said grooves when said first and second doors are in the closed position.

11. A door assembly as set forth in claim 8 wherein said frame comprises a plurality of flange portions, said first and second doors having side edge portions overlying said flange portions when said first and second doors are in the closed position.

12. A door assembly as set forth in claim 8 wherein said first and second doors when in the closed position define a gap between them, said first door including gap hider means for covering the gap between said first and second doors, said gap hider means being connected with an inner surface of said first door and overlapping said second door.

13. A door assembly for an opening of a housing for a vehicle occupant restraint module, said door assembly comprising:

first and second doors connected with said housing for pivotal movement between a closed position and an open position; and retainer means for retaining said doors in the closed position and for releasing said doors to permit pivotal movement of said doors to the open position upon application of a predetermined force to said doors;

said retainer means comprising a frangible member having a first end portion connected with said first door and a second end portion connected with said second door and a central portion intermediate said end portions;

said frangible member central portion being made of a material having a rupture strength which ruptures upon application of a predetermined force, said rupture strength being substantially unvarying over a predetermined range of temperatures encountered by said door assembly in the vehicle, including the range of about $-40°$ F. to about $+185°$ F.

14. A door assembly as set forth in claim 13 wherein said frangible member central portion is made of metal.

15. A door assembly as set forth in claim 13 wherein said frangible member central portion is made of a polymer.

16. A door assembly as set forth in claim 13 wherein said first door has a first finger portion overlapping said second door and said second door has a second finger portion overlapping said first door for preventing inward pivotal movement of said first and second doors.

17. A vehicle occupant restraint apparatus comprising:

an inflatable vehicle occupant restraint for restraining movement of a vehicle occupant;

a source of inflation fluid for providing inflation fluid to inflate said inflatable vehicle occupant restraint; and a housing for containing said inflatable vehicle occupant restraint and said source of inflation fluid in a deployment-ready position, said housing including a frame, a first door having a door portion, and a second door having a door portion, said frame defining an opening in said housing through which said inflatable restraint expands upon deployment;

means for connecting said first and second doors with said frame for outward pivotal movement from a closed position covering said opening to an open position upon deployment of said inflatable restraint;

said first door having a first finger portion overlapping said second door portion when said doors are in the closed position and said second door having a second finger portion overlapping said first door portion when said doors are in the closed position to block inward pivotal movement of said doors; and retainer means for retaining said doors in the closed position and for releasing said doors to permit outward pivotal movement of said doors to the open position upon application of a predetermined outward directed force to said doors, said retainer means having a first portion connected with said first door and a second portion connected with said second door, said retainer means having a rupturable portion made of a metal which ruptures due to a predetermined force which does not vary substantially through a range of temperatures.

18. A vehicle occupant restraint apparatus as set forth in claim 17 wherein said range of temperatures is from about $-40°$ F. to about $+185°$ F.

* * * * *